(12) United States Patent
Smith et al.

(10) Patent No.: US 8,774,681 B2
(45) Date of Patent: Jul. 8, 2014

(54) SCANNER HAVING DRIVEN MEMBER TENSION

(75) Inventors: Ryan Smith, San Diego, CA (US); Rob Mueller, San Diego, CA (US); Kevin Bokelman, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1685 days.

(21) Appl. No.: 12/239,545

(22) Filed: Sep. 26, 2008

(65) Prior Publication Data
US 2009/0109499 A1   Apr. 30, 2009

Related U.S. Application Data

(60) Provisional application No. 60/984,278, filed on Oct. 31, 2007.

(51) Int. Cl.
*G03G 15/00*   (2006.01)
*B41F 31/00*   (2006.01)
*H04N 1/04*    (2006.01)

(52) U.S. Cl.
USPC ............... 399/211; 101/351.2; 358/497

(58) Field of Classification Search
None
See application file for complete search history.

(56) References Cited

U.S. PATENT DOCUMENTS

| | | | |
|---|---|---|---|
| 4,393,411 A * | 7/1983 | Amtower | 358/302 |
| 4,589,035 A | 5/1986 | Yamanishi et al. | |
| 4,651,222 A | 3/1987 | Gokita | |
| 4,711,553 A | 12/1987 | Watanabe | |
| 4,763,165 A | 8/1988 | Watanabe | |
| 5,964,542 A | 10/1999 | Ruhe et al. | |
| 6,553,154 B1 * | 4/2003 | Cheng | 382/312 |
| 7,075,686 B2 | 7/2006 | Hayashi | |
| 7,237,870 B2 | 7/2007 | Chen | |
| 2007/0030534 A1 * | 2/2007 | Ikeno et al. | 358/498 |
| 2007/0201930 A1 * | 8/2007 | Sugiura | 400/354 |
| 2008/0049270 A1 * | 2/2008 | Oguchi | 358/474 |

* cited by examiner

*Primary Examiner* — Benny Q Tieu
*Assistant Examiner* — Sunil Chacko

(57) ABSTRACT

An apparatus in an example comprises a guide, a driven member, and a carriage. Tension in the driven member generates a moment that biases the carriage against the guide.

23 Claims, 6 Drawing Sheets

SCANNER HAVING DRIVEN MEMBER TENSION

CROSS-REFERENCE TO RELATED PATENT APPLICATIONS

This application claims the benefit of U.S. provisional patent application Ser. No. 60/984,278, filed on Oct. 31, 2007, entitled "Scanner Having Driven Member Tension".

BACKGROUND

A scanner can have a transparency media adapter (TMA). The transparency media adapter can have a moving carriage with a lamp in the lid of the scanner that allows scanning of film and slides. A belt may drive the moving carriage holding the lamp in the transparency media adapter.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, moving light bar transparency media adapters have a moving light panel. The light panel can be rectangular. The light panel tracks along with a line scanner to provide backlighting for scanning transparent media such as film and slides (transparencies). The light panels are designed to substantially uniformly backlight the media as the moving light panel traverses the length of the media.

Reduction of the illuminated scanning area of the light panel serves to reduce cost and increase performance of the moving light bar transparency media adapters. Controlling skew between the light panel and the scanner allows reduction of the illumination area of the light panel. In the event that skew cannot be tightly controlled, a larger illumination area of the moving light panel may be required. Thus, accurate control of skew can allow reduction of the size of the illumination area of the light panel and higher performance in terms of higher speed or higher quality and lower cost. An exemplary reduction in the illumination area by ten percent provided increased scanner signal to noise performance and increased speed with little or no cost impact.

An embodiment of the present invention comprises transparency media adapter skew control. The embodiment employs a tensioned drive and/or timing belt as a driven member to move a moving light panel while also providing a relatively constant biasing force to precisely control skew between the light panel and the scanner. The tensioned belt is typically attached to a driven pulley and slides along a rod or track. A motor of the transparency media adapter (TMA) drives the belt, thus allowing accurate tracking of the light panel with the scanner. The motor assembly can also comprise an encoder for accurate motion control and employ direct current (DC) or alternating current (AC) power.

In embodiments of the present invention, a constant biasing force that is proportional to the tension applied to the belt can be maintained throughout the product lifetime. Increased tolerances can thus be allowed in manufacturing of bushings by emphasizing accurate control of relative locations rather than absolute locations and sizes.

In embodiments of the invention, a scanner may be designed to work with illumination from light emitting diodes (LEDs). Turning ON and OFF a sensor and separate LEDs serve to obtain a selected, desired, and/or appropriate color exposure. The LEDs can have a significantly higher cost to brightness ratio than previous cold cathode fluorescent (CCFL) bulbs. Accordingly, the use of LEDs as a light source necessitates the capability to illuminate less than the entire transparent media at one time, so as to reduce cost. Thus, as the relatively small LED illuminated light panel moves along with the scanner, only the area of the transparent media being scanned is backlit rather than the entire transparent media.

Figure 1:
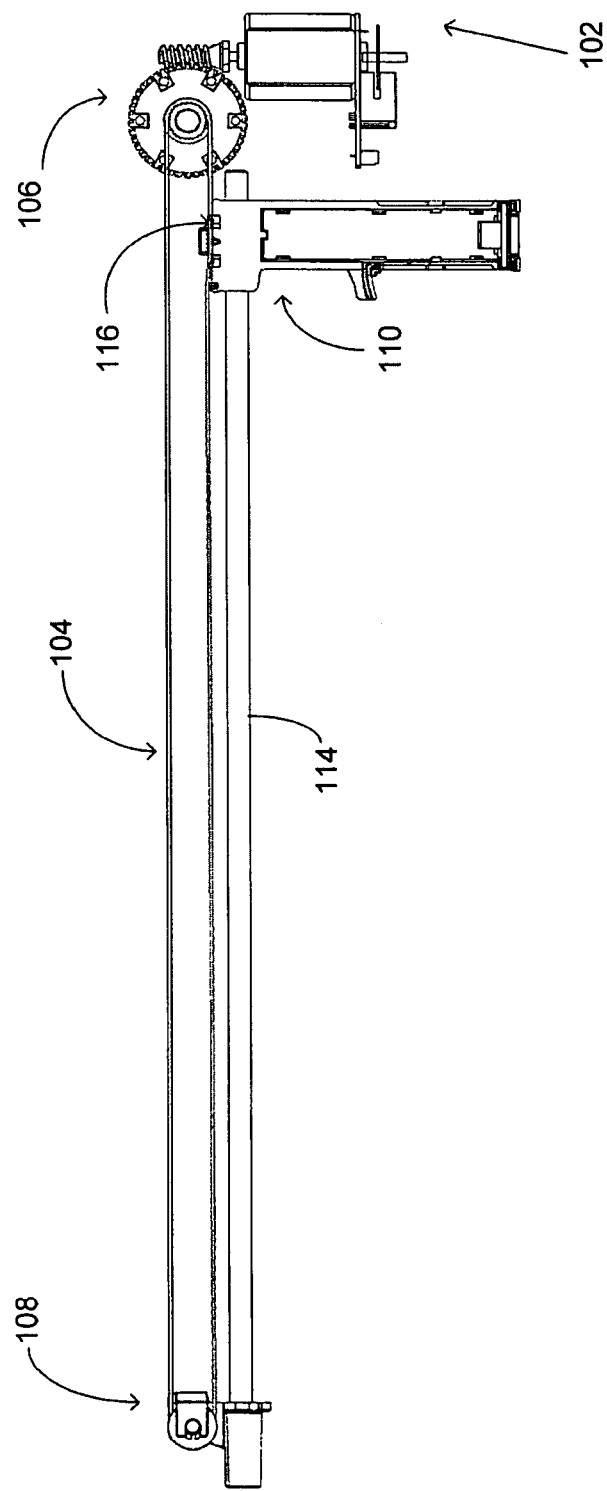
FIG. 1 is a representation of a top view of an implementation of an apparatus that comprises a drive, a driven member, a pulley, a tension contributor, a carriage, and a guide.
Figure 2:
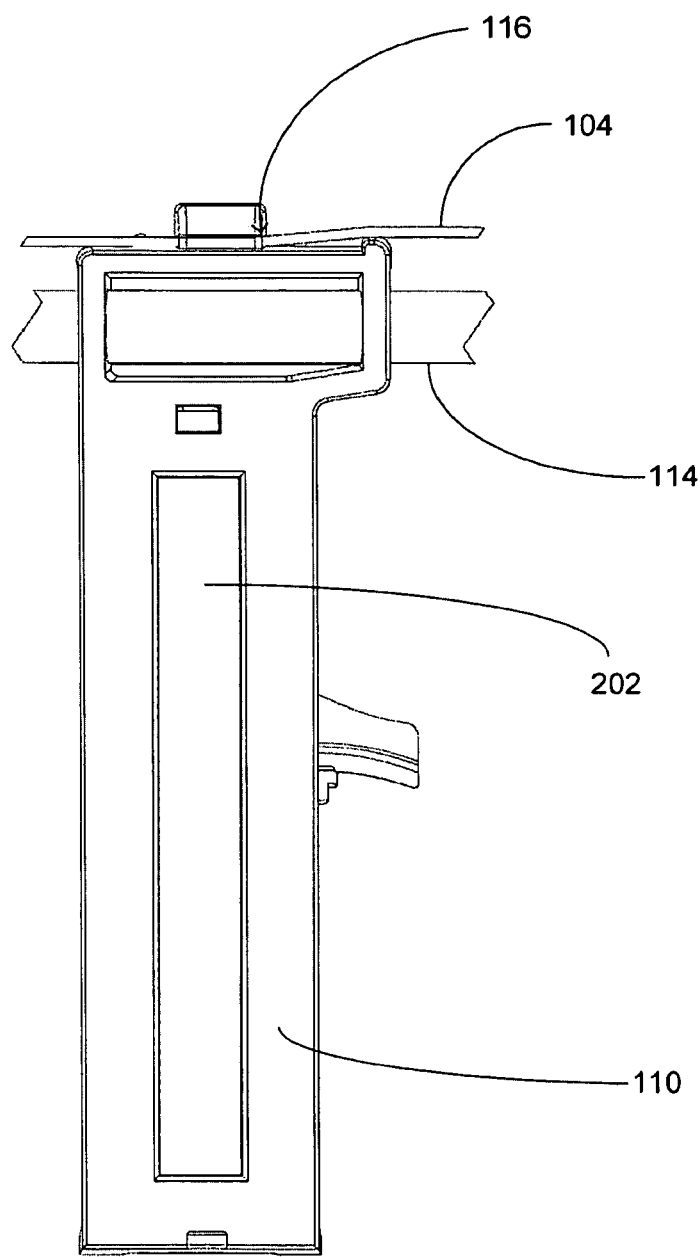
FIG. 2 is a representation of an enlarged, cutaway bottom view (from the opposite side from the view of FIG. 1) of the driven member, the carriage, and the guide of an implementation of the apparatus of FIG. 1 and illustrates an illumination area.
Figure 3:
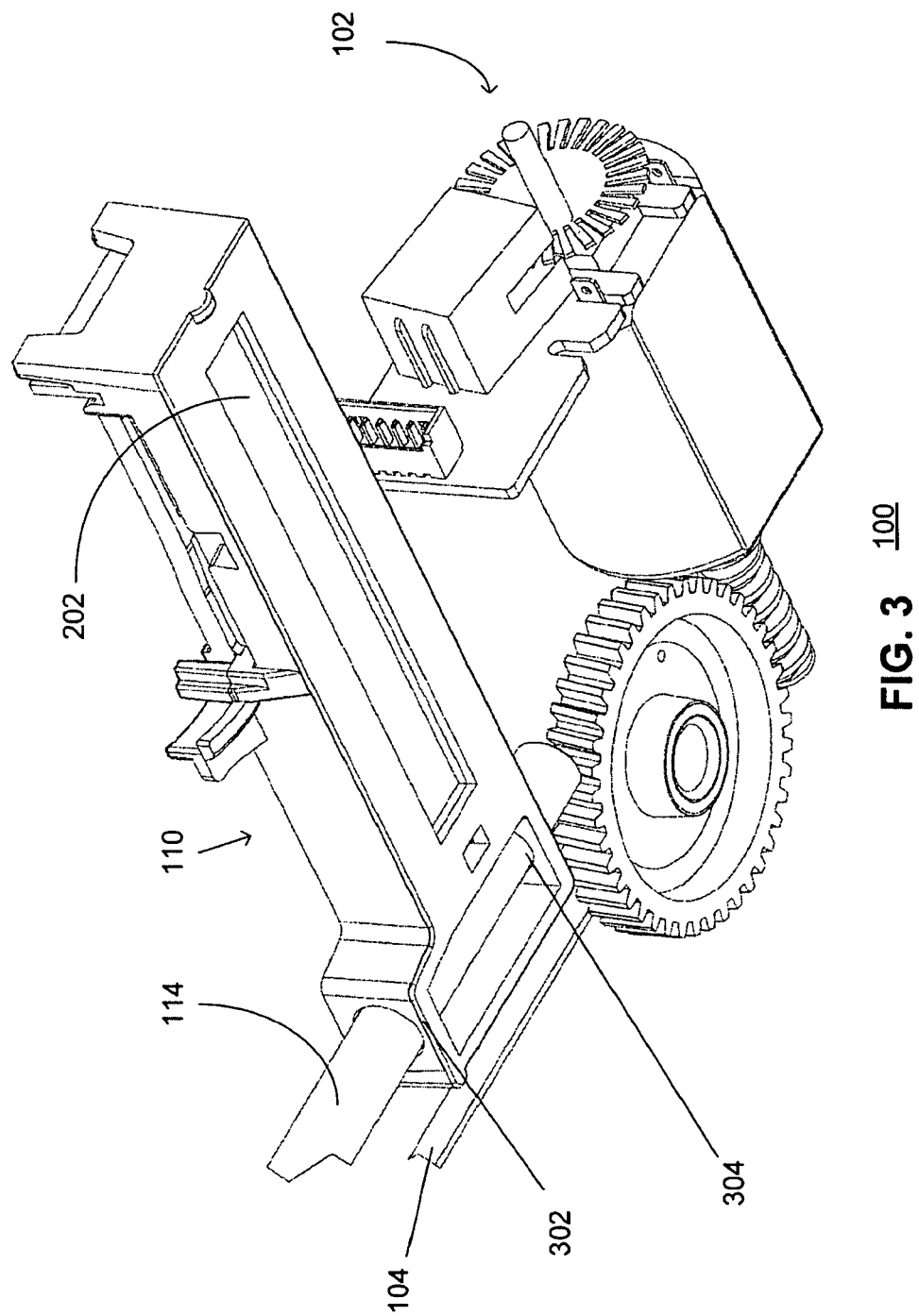
FIG. 3 is a representation of an enlarged, cutaway perspective view of the drive, the driven member, the carriage, the guide, and the illumination area of an implementation of the apparatus of FIG. 2 and illustrates bushings.
Figure 5:
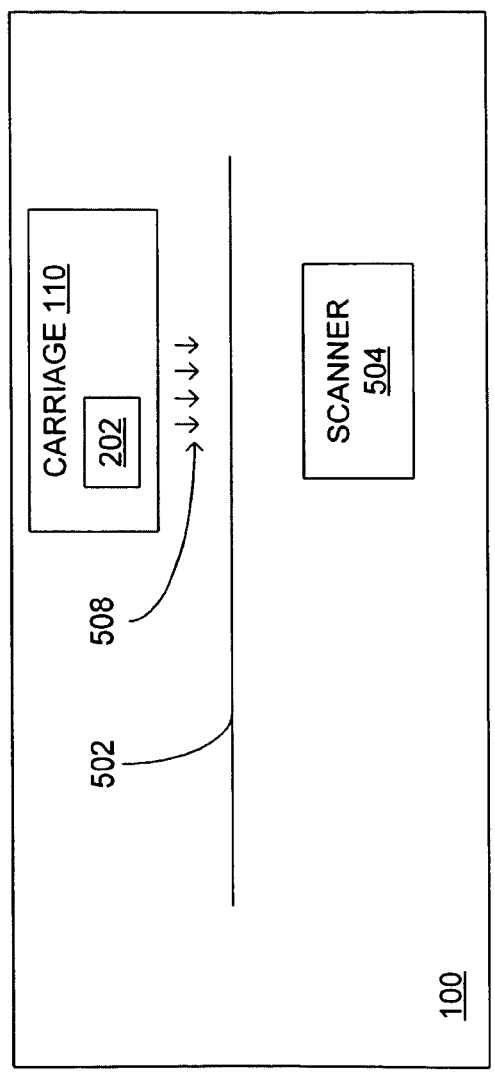
FIG. 5 is an elevation representation of an implementation of the apparatus of FIG. 1 and illustrates the illumination area on the carriage, a medium, and a scanner.
Figure 6:
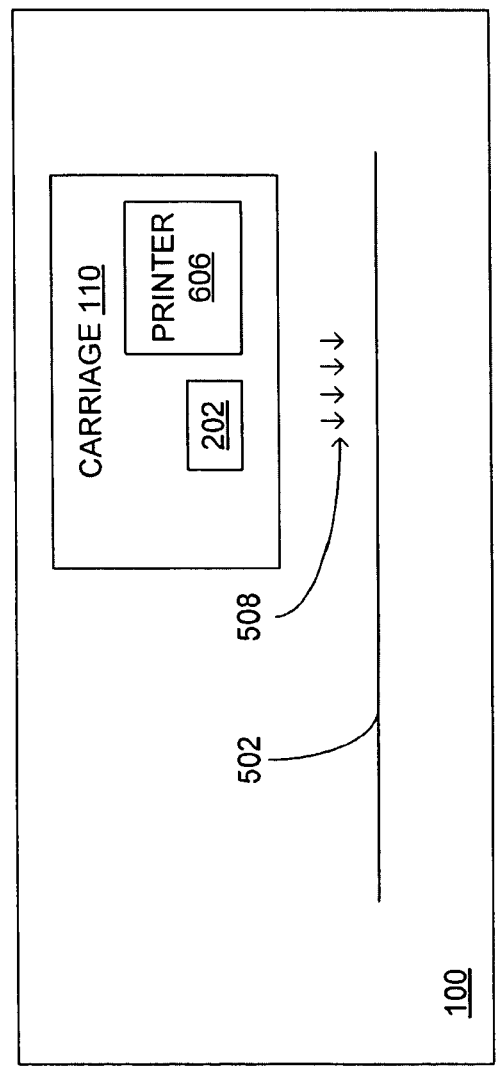
FIG. 6 is an elevation representation of an implementation of the apparatus of FIG. 1 and illustrates the illumination area and a printer on the carriage and a medium.

Turning to FIGS. 1, 2, 3, and 5, an embodiment of the invention includes apparatus 100, which comprises one or more of a drive 102, a driven member 104, a pulley 106 such as a drive pulley, a tension contributor 108, a carriage 110, a guide 114, an illumination area 202 (included within carriage 110, as shown in FIG. 2), bushings 302, 304 (included within carriage 110, as shown in FIG. 3), one or more media 502 (FIG. 5), and a scanner 504 (FIG. 5). Referring to FIG. 5, the illumination area 202 and the scanner 504 comprise a combined component that serves to capture the image present on the medium 502. In another example, the illumination area 202 comprises an add-on feature to an existing scanning device. The scanner 504 may comprise a multi-function scanner and copier. Referring to FIG. 6, a further implementation of the apparatus 100 may include printer 606.

Referring to FIGS. 5 and 6, a projection path 508 from the carriage 110 to the medium 502 may represent light from the illumination area 202 (FIG. 5). The illumination area 202 comprises light emitting diodes (LEDs). The medium 502 may comprise a transparent medium such as film or a transparent slide.

Referring to back to FIG. 1, the drive 102 in an example comprises a drive system such as a DC motor with a worm gear drive or other suitable type of drive system, as will be understood by those skilled in the art. The driven member 104 comprises a timing belt or other tensioned member. The driven member 104 may be permanently tensioned and/or pre-loaded. The driven member 104, in an exemplary embodiment, comprises high tensile strength, aramid fiber reinforced timing belt. An exemplary fiber for the driven member 104 is offered under the registered trademark KEVLAR® by E.I. du Pont de Nemours and Company, 1007 Market Street Wilmington, Del., USA 19898.

The driven member 104 serves to provide accurate motion control. Tension forces are induced by a spring contained within the tension contributor 108. The driven member 104 is tensioned over the pulley 106 through employment of the tension contributor 108. The tension contributor 108 comprises a spring supported with a tension bracket.

The carriage 110 slides on the guide 114. The guide 114 in an example comprises a polished steel rod or other types of guides, as will be appreciated by those skilled in the art. Referring to FIGS. 1 and 3, the carriage 110 supports the illumination area 202 for movement on the guide 114. Referring to FIGS. 1, 3 and 5, the driven member 104 serves to track the illumination area 202 with a scanner 504 (FIG. 5) such as a line scanner, as will be appreciated by those skilled in the art.

Referring to FIGS. 3 and 5, bushings 302, 304 are located between the carriage 110 and the guide 114 for slidable movement tracked with the scanner 504 under control of the tension in the driven member 104. Employment of the moment generated by the tension in the driven member 104 with emphasis on accurate control of relative location of the carriage 110 and deemphasis on effect of absolute location and size of the carriage 110 serves to allow increased tolerances for the bushings 302, 304.

Figure 4:
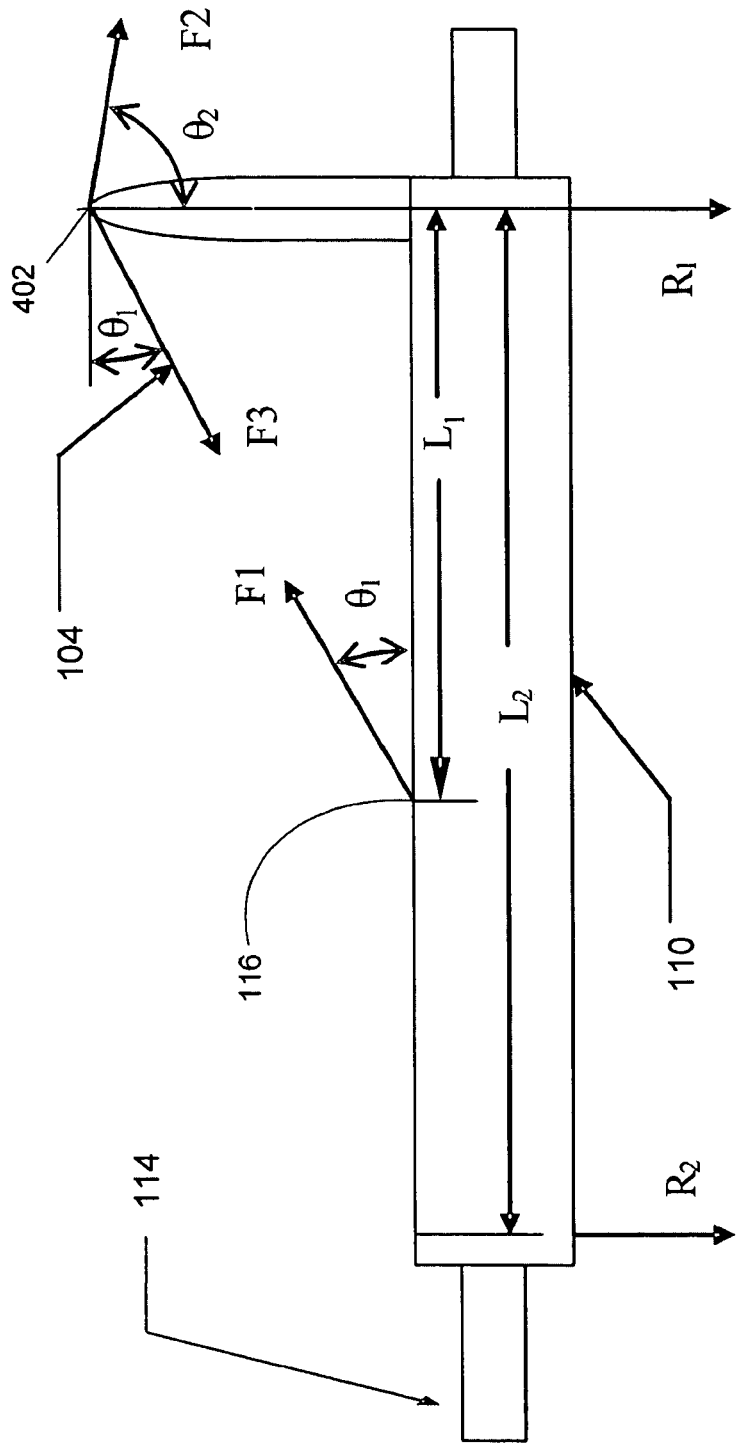
FIG. 4 is a representation of a force diagram taken with respect to FIG. 2 for the driven member, the carriage, and the guide.

Referring to FIGS. 1, 2, and 4, tension in the driven member 104 serves to provide a relatively constant biasing moment and/or force. A biasing moment is applied in a clockwise direction as viewed of FIG. 1 and a counterclockwise direction as viewed in FIGS. 2 and 4. FIGS. 2 and 4 are depictions from the bottom side of the apparatus 100 and are a reverse view from FIG. 1, which is a depiction of the top side of the apparatus 100. In FIG. 4, theta-1 ($\theta_1$) and theta-2 ($\theta_2$) are the angles that driven member 104 makes with contact point 402 of carriage 110 (as shown in FIG. 4). In the embodiment FIG. 4, Theta-2 ($\theta_2$) may be very close to ninety (90) degrees as the carriage moves away from the tension contributor 108. As the carriage 110 moves closer to the tension contributor 108, theta-2 ($\theta_2$) may vary from 89.9 degrees when the carriage 110 is at the travel stop near the pulley 106 to 88.7 degrees when the carriage 110 is at the travel stop near the tension contributor 108.

Variation of geometry such as to select the angles theta-1 ($\theta_1$) and/or theta-2 ($\theta_2$) may serve to adjust contribution of force such as F1, F2, F3 relative to theta-2 ($\theta_2$) to be nearly constant or to be variable. For example, variation of the geometry to affect the angle theta-2 ($\theta_2$) may serve to increase the biasing moment from tension in the driven member 104 such as at an end of travel of the carriage 110. In a further example, contribution of the angle theta-2 ($\theta_2$) may be constrained, reduced, and/or minimized to promote a more and/or relatively constant biasing force such as to promote accuracy in controlling skew of the carriage 110, for example, skew between the illumination area 202 and the scanner 504.

An embodiment of the invention constrains variation in the biasing moment around attachment point 116 on the carriage 110 for the driven member 104 over a length of travel of the carriage 110 to fifteen percent or less relative to the average of the biasing moment.

In FIG. 4, L2 comprises a space between the bushings 302, 304 (of FIG. 3). The bushings 302, 304 in the example of FIG. 3 comprise low tolerance (and thus lower cost) cylindrical bushings on a cylindrical guide rod as the guide 114. The fit of the bushings 302, 304 to the slider rod as the guide 114 can be relatively relaxed. The bushings 302, 304 are precisely located relative to each other on the carriage 110. An exemplary embodiment of the bushings 302, 304 comprises a slot riding on a guide rib as the guide 114. An implementation employs lower tolerance bushings as the bushings 302, 304 that are accurately positioned in the carriage 110.

In FIG. 4, L1 is the distance from the bushing 304 to the attachment point 116 for the driven member 104. R1 and R2 are the reaction forces at the bushings 302, 304. L1 is equal to 7 mm while L2 equals 19 mm. Belt tension F3 in the driven member 104 equals 4.5 N. Theta-1 equal 5 degrees. Theta-2 equals approximately 90 degrees, for example, varying from 88.7 to 89.9 degrees depending on the distance between carriage 110 and tension contributor 108, as previously described herein. For exemplary calculation purposes in the equations below, the contact interface between the tension member 104 and the carriage 110 at a point 402 is assumed to be frictionless.

Equations follow in connection with moments M and forces F.

$$\sum M_{R_1} = 0$$
$$= -FL_1 \sin\theta_1 + R_2 L_2 \Rightarrow R_2$$
$$= \frac{FL_1 \sin\theta_1}{L_2}$$
$$= 0.15 \text{ N}$$

$$\sum F_y = 0$$
$$= -R_1 - F\sin\theta + F\sin\theta - F\cos\theta_2 - R_2 \Rightarrow R_1$$
$$= -R_2 - F\cos\theta_2$$
$$= -0.16 \text{ N to } -0.25 \text{ N}$$

$$\sum M_{116} = R_2(L_2 - L_1) - (-R_2 - F\cos\theta_2)L_1 - FL_1\sin\theta_1 - FL_1\cos\theta_2$$
$$= 0.09 \text{ Nmm to } 0.12 \text{ Nmm}$$

Referring to FIGS. 3 and 4, the bushing 302 carries reaction force R1. The bushing 304 carries reaction force R2. The bushings 302, 304 are designed and located in such a manner that when this biasing force is applied to a nominal part the carriage 110 will sit perpendicular to the guide 114.

An exemplary embodiment, such as that of FIG. 4, comprises a guide 114, a driven member 104, and a carriage 110. Tension in the driven member 104 generates a moment that biases the carriage 110 against the guide 114. The moment generated by the tension in the driven member 104 serves to reduce variation of skew of the carriage 110. Referring to FIGS. 4 and 5, the moment generated by the tension in the driven member 104 serves to reduce the variation of skew between the carriage 110 and the scanner 504.

Referring to FIG. 1, the driven member 104 maintains substantially throughout a product lifetime of the driven member 104 a substantially constant biasing force that is proportional to the tension applied to the driven member 104 to generate the moment that biases the carriage 110 against the guide 114. Referring to FIGS. 1 and 2, the carriage 110 comprises the illumination area 202 of light emitting diodes (LEDs). Referring to FIGS. 1, 2 and 5, the moment generated by the tension in the driven member 104 serves to reduce variation of skew between the illumination area 202 of FIG. 5 of LEDs and the scanner 504. The moment generated by the tension in the driven member 104 serves to promote accurate control of location of the illumination area 202 relative to the scanner 504 and deemphasize effect of absolute location and size of the illumination area 202 and the scanner 504.

An exemplary approach employs a preloaded-tension driven member 104 to cause the preloaded-tension driven member 104 to occupy a statically determinate state in which tension in the preloaded-tension driven member 104 generates a moment that biases a carriage 110 coupled with the preloaded-tension member against a guide 114 that movably supports the carriage 110.

Turning to FIG. 4, the forces F1, F2, and F3 applied by the driven member 104 are equivalent and equal to the belt tension F3 to constrain variation in the biasing moment around the attachment point 116 on the carriage 110 for the driven member 104 and maintain a relatively constant biasing force that is proportional to the belt tension F3, where a relatively constant biasing moment serves to promote precise control of skew of the carriage 110, for example with reference to FIG. 5, skew between the illumination area 202 and the scanner 504. The interface between the driven member 104 and the attachment point 116 on the carriage 110 at F2 and F3 was assumed to be zero friction for simplicity, although in reality this interface will have some small interaction on the forces F2 and F3 involved. Referring to FIGS. 3 and 4, the reaction forces R1 and R2 are the forces applied between the guide 114 and the bushings 302, 304 on the carriage 110 as a result of the biasing. As the carriage 110 moves toward the right as viewed in FIG. 4 to be closer to the tension contributor 108 (FIG. 1) and away from the left as viewed in FIG. 4 to be further from the pulley 106, the angle theta-2 will no longer be nearly ninety (90) degrees and the belt tension F3 will begin to make some contribution to the reaction force R1 or the moment about 116. For example, theta-2 ($\theta_2$) may be very close to ninety (90) degrees and may vary with the distance of the carriage 110 from the tension contributor 108, varying in an example from 89.9 degrees when the carriage 110 is at the travel stop near the pulley 106 to 88.7 degrees when the carriage 110 is at the travel stop near the tension contributor 108. A design could also be envisioned whereby pulley 106 is located such that the angle, theta-2 ($\theta_2$) may be ninety (90) degrees throughout the entire length of travel resulting in a constant biasing moment.

An implementation of the apparatus 100 comprises a plurality of components such as one or more of electronic components, chemical components, organic components, mechanical components, and hardware components, optical components, and/or computer software components. A number of such components can be combined or divided in an implementation of the apparatus 100. In one or more exemplary implementations, one or more features described herein in connection with one or more components and/or one or more parts thereof are applicable and/or extendible analogously to one or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An implementation of the apparatus 100 comprises any (e.g., horizontal, oblique, angled, or vertical) orientation, with the description and figures herein illustrating an exemplary orientation of an exemplary implementation of the apparatus 100, for explanatory purposes.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:
1. An apparatus, comprising:
a guide;
a driven member; and
a carriage;
wherein tension in the driven member generates a moment that rotationally biases the carriage against the guide wherein the tension is generated by a spring force.
2. The apparatus of claim 1, wherein the moment generated by the tension in the driven member serves to reduce variation of skew of the carriage.
3. The apparatus of claim 2, further comprising:
a scanner, wherein the moment generated by the tension in the driven member serves to reduce the variation of skew between the carriage and the scanner.
4. The apparatus of claim 1, wherein the driven member maintains substantially throughout a product lifetime of the driven member a substantially constant biasing force that is proportional to the tension applied to the driven member to generate the moment that biases the carriage against the guide.
5. The apparatus of claim 1, wherein the carriage movably supports a transparency media scanner illumination area.
6. The apparatus of claim 1, wherein the carriage comprises an illumination area of light emitting diodes (LEDs), the apparatus further comprising:
a scanner, wherein the moment generated by the tension in the driven member serves to reduce variation of skew between the illumination area of LEDs and the scanner.
7. The apparatus of claim 6, wherein the moment generated by the tension in the driven member serves to promote accurate control of location of the illumination area relative to the scanner and deemphasize effect of absolute location and size of the illumination area and the scanner.
8. The apparatus of claim 1, wherein the carriage slidably supports a transparent-media illumination area relative to the guide, wherein the moment generated by the tension in the preloaded-tension driven member serves to reduce variation of skew between the transparent-media illumination area and a scanner.
9. The apparatus of claim 1, wherein the apparatus comprises a multi-function scanner and copier.
10. The apparatus of claim 9, wherein the moment generated by the tension in the driven member serves to promote accurate control of relative location of the carriage and deemphasize effect of absolute location and size of the carriage.
11. The apparatus of claim 1, wherein the apparatus comprises a multi-function printer and copier.
12. The apparatus of claim 1, further comprising:
a scanner; and
bushings located between the carriage and the guide for slidable movement tracked with the scanner under control of the tension in the driven member.
13. The apparatus of claim 12, wherein employment of the moment generated by the tension in the driven member with emphasis on accurate control of relative location of the carriage and deemphasis on effect of absolute location and size of the carriage serves to allow increased tolerances for the bushings.
14. The apparatus of claim 1, wherein the driven member is permanently tensioned.

15. The apparatus of claim 1, wherein employment of the moment generated by the tension in the driven member causes the driven member to occupy a statically determinate state.

16. An apparatus, comprising:
   a drive;
   a driven member coupled with the drive;
   a carriage coupled with the driven member; and
   a guide coupled with the carriage;
   wherein the drive moves the carriage along the guide;
   wherein tension in the driven member generates a moment that rotationally biases the carriage against the guide and wherein the tension is generated by a spring force.

17. The apparatus of claim 16, wherein the driven member comprises a timing belt.

18. The apparatus of claim 16, wherein the driven member is tensioned over a pulley, wherein the guide comprises a rod, wherein the carriage slides on the rod.

19. The apparatus of claim 16, further comprising:
   a scanner, wherein the carriage supports an illumination area for movement on the guide, wherein the driven member serves to track the illumination area with the scanner.

20. The apparatus of claim 19, wherein the moment generated by the tension iii the driven member serves to reduce variation of skew between the illumination area and the scanner.

21. A method, comprising the step of:
   employing a preloaded-tension driven member to cause the preloaded-tension driven member to occupy a statically determinate state in which tension in the preloaded-tension driven member generates a moment that rotationally biases a carriage coupled with the preloaded-tension member against a guide that movably supports the carriage wherein the preloaded-tension is generated by a spring force.

22. The method of claim 21, further comprising the step of:
   promoting accurate control of location of an illumination area on the carriage relative to a scanner through employment of the moment generated by the tension in the preloaded-tension member and deemphasis effect of absolute location and size of the illumination area and the scanner.

23. The method of claim 21, further comprising the step of:
   employing the carriage to slidably support a transparent-media illumination area relative to the guide, wherein the moment generated by the tension in the preloaded-tension driven member serves to reduce variation of skew between the transparent-media illumination area and a scanner.

* * * * *

UNITED STATES PATENT AND TRADEMARK OFFICE
CERTIFICATE OF CORRECTION

| | |
|---|---|
| PATENT NO. | : 8,774,681 B2 |
| APPLICATION NO. | : 12/239545 |
| DATED | : July 8, 2014 |
| INVENTOR(S) | : Ryan Smith et al. |

It is certified that error appears in the above-identified patent and that said Letters Patent is hereby corrected as shown below:

In the Claims

In column 7, line 24, in Claim 20, delete "iii" and insert -- in --, therefor.

Signed and Sealed this
Twenty-first Day of October, 2014

Michelle K. Lee
*Deputy Director of the United States Patent and Trademark Office*